I. M. CLAUDE.
TIRE HOLDER.
APPLICATION FILED JUNE 5, 1915.
1,201,698.
Patented Oct. 17, 1916.
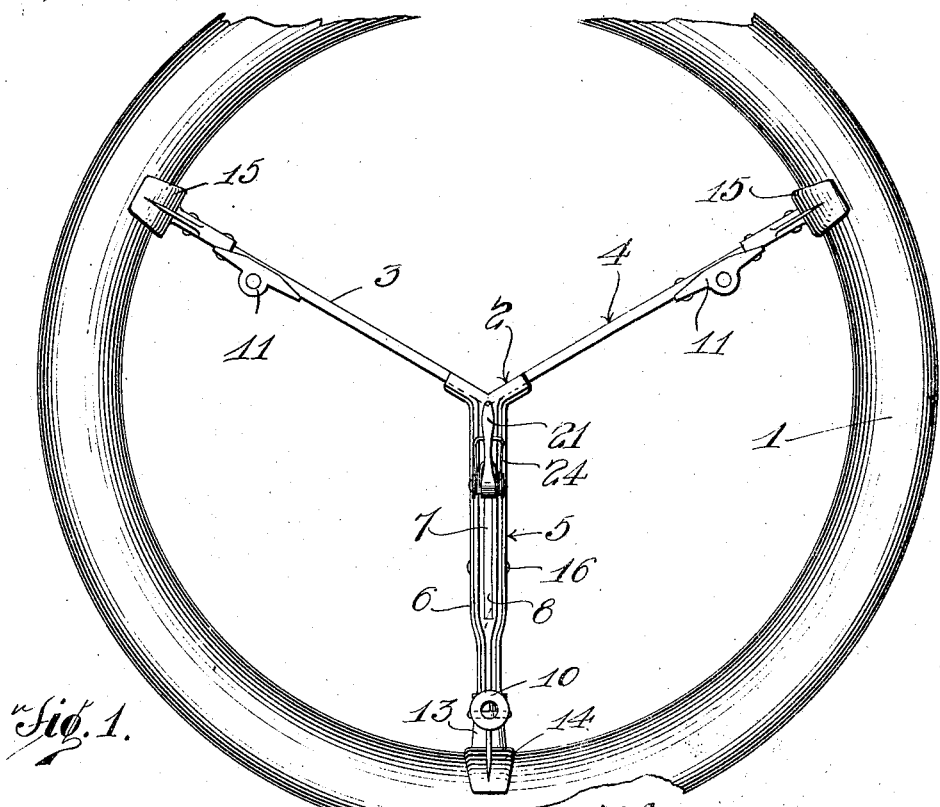
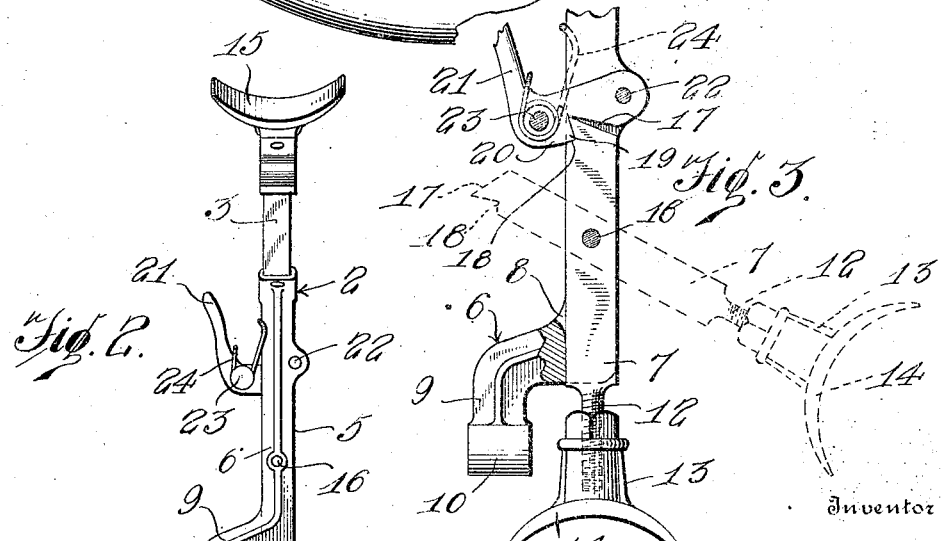
Witnesses
C. R. Hardy
W. E. Valk Jr.
Inventor
Ira M. Claude
By Richard B. Owen
Attorney

UNITED STATES PATENT OFFICE.

IRA M. CLAUDE, OF DELAVAN, MINNESOTA.

TIRE-HOLDER.

1,201,698.

Specification of Letters Patent.

Patented Oct. 17, 1916.

Application filed June 5, 1915. Serial No. 32,388.

*To all whom it may concern:*

Be it known that I, IRA M. CLAUDE, a citizen of the United States, residing at Delavan, in the county of Faribault and State of Minnesota, have invented certain new and useful Improvements in Tire-Holders, of which the following is a specification.

My invention relates to tire holders or tire locks such as are used on automobiles for holding an auxiliary pneumatic tire.

An object of the invention is to provide an all-metallic tire holder of simple and inexpensive construction.

As a further object of the invention I contemplate a tire holder in which the tire engaging arms or parts contact only with the inner periphery of the tire and through outward pressure exerted thereon maintain the tire against displacement or collapse and in such condition as to permit of ready actual use should occasion demand.

I still further contemplate a tire holder of novel construction whereby the entire device may be inclosed or encircled by the tire held to thus occupy, in use, a minimum of space.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is an elevation of my improved device illustrating the application thereof; Fig. 2 is an edge view; and Fig. 3 is an enlarged view, partly broken away, and similar to that of Fig. 2, the dotted lines indicating the relative movement of one of the tire holder parts.

Referring now to the drawings by numerals, 1 designates an auxiliary pneumatic tire, and 2 as an entirety the device of my invention affording a support or holder therefor. The holder 2 in its preferred embodiment may be said to consist of a plurality of radial arms designated respectively 3, 4 and 5 (there being preferably three).

The arm 5 of the holder is made up of or comprises a stationary arm part or section 6 and a relatively movable arm part or section 7, the former, part 6, being longitudinally grooved or slotted as indicated at 8 to receive the latter part 7 when locked immovable relatively thereto and swung into a position in parallelism therewith.

The stationary part 6 of the arm 5 is extended laterally as indicated at 9 to terminate in a collar like head portion 10 which, in actual practice, is utilized as a means whereby the device as an entirety is fastened to the running board or other convenient part of the machine. Each of the arms 3 and 4 is also equipped with an attachment 11 to which brace arms (not shown) may be fastened to properly and effectually maintain the device against casual displacement while in use.

A threaded shank 12 is formed integrally with and at one end of the movable arm section 7 whereby to provide for adjustment of a tire engaging member 13 relatively thereto. The member 13 is equipped with an arcuate plate terminal 14, which plate is adapted for engagement with the inner periphery of the tire 1 that the tire, through the medium of the mentioned plate 14 and like plates 15 affixed to the arms 3 and 4, may be held in place. Each of the mentioned plates 14 and 15 are of a configuration approximately that of the tire 1. The member 13 is adjustable in that tires of varying diameters may be held. If desired, each of the mentioned radial arms may be equipped with a double arcuate plate terminal that two auxiliary tires may be held.

The movable part 7 of the arm 5 is pivoted as at 16 to the stationary arm part or section 6 to move from a position within to a position without the above or as indicated by the dotted lines in Fig. 3. Upon the opposite end of the arm section 7 from that upon which the shank 12 is formed is provided a beveled edge 17 and a recess 18, the latter, when the arm part 7 is in parallelism with arm part 6 receiving a complemental enlargement 19 formed integrally with and upon the lower cam face 20 of a lever 21 pivoted as at 22 to operate in the groove 18 and to the stationary arm part or section 6. Lever 21 carries a pin 23 over the terminals of which a coil spring 24 is arranged, the ends of this spring abutting respectively the lever 21 and the arm 5 that the former may at all times assume the position shown in Fig. 3 and operate automatically to releasably lock the movable arm section 7 the moment said arm 6 shall have been swung into parallelism with arm 5.

In use, the arm section 7 is first swung into the position indicated by the dotted lines in Fig. 3 whereupon the device as an entirety is placed within the tire to be held in such a manner as to swing the arcuate plates 15 into positive contact with the inner periphery of the tire. Member 13 is previously adjusted upon the threaded extension 12 to increase the length of arm 5 sufficient to permit, by swinging movement of the arm section 7, said section to extend in parallelism with the section 6 and the arcuate plate 14 to engage with the inner periphery of the tire. In moving the arm section 7, the beveled terminal 17 of said section will contact with the cam surface 20 of the lever 21 and through the contact thus provided, slightly elevate the lever against tension of the spring 24 until the enlargement 19 of the lever is properly seated within the recess 18 therefor of the arm section 7. When thus positioned, spring 24 will immediately and automatically aid in positioning the lever 21 that said arm section 7 may be positively yet releasably locked and held in place. When thus positioned, outward adjustment of the member 13 as before suggested, or until the several plates 14 and 15 contact firmly with the inner periphery of the tire, will cause the latter to be properly and effectually held against displacement and against collapse.

From the foregoing, taken in connection with the accompanying drawings it is evident that the device of my invention may be arranged entirely within the space defined by the tire 1; that the mentioned tire may be quickly detached through adjustment of the member 13 and operation of the lever 21; and that a positive lock means may be associated with the device that the arm section 7 may be held against movement relatively to the arm section 6.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a tire holder, connected radial arms mounted to be embraced by the tire and to engage with the inner periphery thereof, one of said arms comprising a fixed section and a relatively movable section, said movable section having pivotal connection with said fixed section to permit of swinging movement from a position into a position out of parallelism with said fixed arm section, and a spring fastening means carried by said fixed arm section to engage with the movable arm section to releasably lock said movable arm section in parallelism with the fixed arm section when thus positioned.

2. In a tire holder, connected arms mounted to engage with the tire to be held, one of said arms comprising a stationary arm section and a relatively movable arm section, said movable arm section being pivotally connected to the stationary arm section to permit of swinging movement from a position in parallelism to a position out of parallelism therewith, a member adjustable upon the movable arm section to vary the length of the radial arm of which said section is a part, a lever pivoted to the stationary arm section in such proximity to the inner end of the movable arm section as to engage therewith and afford a lock means whereby said movable arm section is held in parallelism with the stationary arm section when thus positioned, and spring means associated with said lever to yieldingly maintain the latter against movement.

3. In a tire holder, relatively fixed connected radial arms, means on the arms adapted to be embraced by the tire, a radial arm with means for attachment to a motor vehicle, said last mentioned arm being formed of spaced bars, an arm disposed between the spaced bars, pivoted thereto approximately intermediate its length for movement into and out of parallelism with the attaching arm, its movement being limited in one direction by abutment with the attaching arm, a spring catch pivoted between the spaced bars, having a lower cam-face and shoulder engageable by the inner end of the movable bar, to retain it against movement in the opposite direction, and means on the outer end of said movable bar for engaging the tire.

In testimony whereof I affix my signature in presence of two witnesses.

IRA M. CLAUDE.

Witnesses:
O. PERRIZO,
B. A. SOULE.